(12) United States Patent
Li et al.

(10) Patent No.: US 11,794,298 B2
(45) Date of Patent: Oct. 24, 2023

(54) MILLING MACHINE PROCESSING SYSTEM WITH INTELLIGENTLY FOLLOW-UP CUTTING FLUID NOZZLE AND WORKING METHOD THEREOF

(71) Applicant: QINGDAO UNIVERSITY OF TECHNOLOGY, Shandong (CN)

(72) Inventors: Changhe Li, Qingdao (CN); Wentao Wu, Qingdao (CN); Huajun Cao, Qingdao (CN); Cong Mao, Qingdao (CN); Wenfeng Ding, Qingdao (CN); Naiqing Zhang, Qingdao (CN); Menghua Sui, Qingdao (CN); Han Zhai, Qingdao (CN); Teng Gao, Qingdao (CN); Yanbin Zhang, Qingdao (CN); Min Yang, Qingdao (CN); Dongzhou Jia, Qingdao (CN); Qingan Yin, Qingdao (CN); Xiaoyang Zhang, Qingdao (CN); Yali Hou, Qingdao (CN)

(73) Assignee: QINGDAO UNIVERSITY OF TECHNOLOGY, Shandong (CN)

( * ) Notice: Subject to any disclaimer, the term of this patent is extended or adjusted under 35 U.S.C. 154(b) by 695 days.

(21) Appl. No.: 16/959,612

(22) PCT Filed: Dec. 6, 2018

(86) PCT No.: PCT/CN2018/119447
§ 371 (c)(1),
(2) Date: Jul. 1, 2020

(87) PCT Pub. No.: WO2019/205643
PCT Pub. Date: Oct. 31, 2019

(65) Prior Publication Data
US 2020/0368867 A1    Nov. 26, 2020

(30) Foreign Application Priority Data

Apr. 24, 2018  (CN) .......................... 201810372196.5
Apr. 24, 2018  (CN) .......................... 201820589098.2

(51) Int. Cl.
*B23Q 11/10*   (2006.01)
*B23Q 17/09*   (2006.01)

(52) U.S. Cl.
CPC ...... *B23Q 11/1076* (2013.01); *B23Q 17/0985* (2013.01); *B23C 2250/12* (2013.01);
(Continued)

(58) Field of Classification Search
CPC . B23Q 11/1076; B23Q 11/10; B23Q 11/1038; B23Q 11/1053; B23Q 17/0985
See application file for complete search history.

(56) References Cited

U.S. PATENT DOCUMENTS 7,101,256 B2 *   9/2006  Sudo ...................... B24B 49/12
                                                              451/6
11,524,379 B2 * 12/2022  Li ........................ B23Q 11/1053
(Continued)

FOREIGN PATENT DOCUMENTS

CN    201471210 U  *  5/2010
CN    103692283 A  *  4/2014
(Continued)

OTHER PUBLICATIONS

Mar. 6, 2019 Search Report issued in International Patent Application No. PCT/CN2018/119447.
(Continued)

*Primary Examiner* — Erica E Cadugan
(74) *Attorney, Agent, or Firm* — True Shepherd LLC; Andrew C. Cheng

(57) ABSTRACT

A milling machine processing system with an intelligently follow-up cutting fluid nozzle and a working method thereof
(Continued)

including a workpiece stage, a milling machine box arranged above the workpiece stage, a milling cutter mechanism mounted on the milling machine box for processing workpieces on the workpiece stage, a rotating mechanism mounted on an end surface of the milling machine box located at a side of a milling cutter, the rotating mechanism is connected with a two-axis linkage mechanism and drives the two-axis linkage mechanism to rotate about a center line where the milling cutter is located, the two-axis linkage system is connected with a nozzle through an angle adjusting mechanism and is used for adjusting a position and an angle of the nozzle, and the milling machine processing system has an infrared temperature detection module for collecting the temperature of a processing region.

3 Claims, 8 Drawing Sheets

(52) U.S. Cl.
CPC ............... *B23Q 2717/006* (2013.01); *Y10T 409/303752* (2015.01); *Y10T 409/304032* (2015.01)

(56) References Cited

U.S. PATENT DOCUMENTS

| | | | | |
|---|---|---|---|---|
| 2008/0098954 A1* | 5/2008 | Banks | ................ | B23Q 11/1076 118/300 |
| 2016/0089808 A1* | 3/2016 | Watanabe | ................ | B26F 3/004 83/177 |
| 2016/0346889 A1* | 12/2016 | Gong | ................ | B23Q 11/1076 |
| 2016/0348773 A1* | 12/2016 | Sebert | ................ | B23Q 11/1076 |
| 2017/0326701 A1* | 11/2017 | Morimura | ................ | B23Q 7/04 |
| 2018/0071877 A1* | 3/2018 | Li | ................ | B23Q 11/10 |
| 2020/0230767 A1* | 7/2020 | Zhao | ................ | B23Q 11/1076 |
| 2022/0001505 A1* | 1/2022 | Sekine | ................ | B23Q 11/1076 |

FOREIGN PATENT DOCUMENTS

| | | | | |
|---|---|---|---|---|
| CN | 103921166 | A | | 7/2014 |
| CN | 204800372 | U | | 11/2015 |
| CN | 103921166 | B | | 2/2016 |
| CN | 205599992 | U | | 9/2016 |
| CN | 106392762 | A | | 2/2017 |
| CN | 206010612 | U | | 3/2017 |
| CN | 206296730 | U | | 7/2017 |
| CN | 206578629 | U | | 10/2017 |
| CN | 107639465 | A | | 1/2018 |
| CN | 206952658 | U | | 2/2018 |
| CN | 108436586 | A | | 8/2018 |
| CN | 109108723 | A | * | 1/2019 |
| CN | 208773153 | U | * | 4/2019 |
| CN | 212705747 | U | * | 3/2021 |
| CN | 114770216 | A | * | 7/2022 |
| CN | 115194547 | A | * | 10/2022 |
| JP | 07-204978 | A | * | 8/1995 |
| JP | H11-320325 | A | | 11/1999 |
| JP | 2003-001546 | A | * | 1/2003 |
| JP | 2004-167665 | A | * | 6/2004 |
| KR | 10-1781742 | B1 | | 9/2017 |

OTHER PUBLICATIONS

Mar. 6, 2019 Written Opinion of the International Searching Authority issued in International Patent Application No. PCT/CN2018/119447.

* cited by examiner

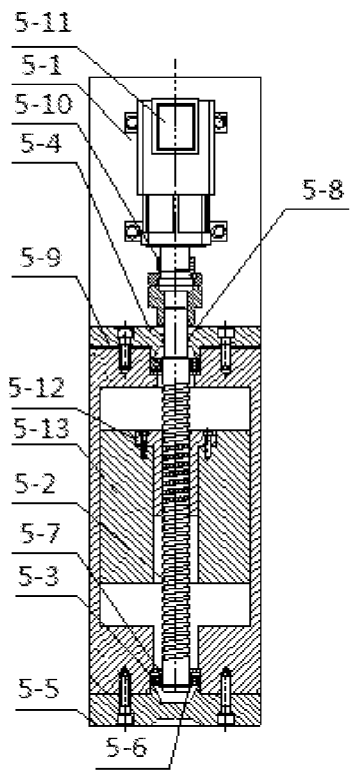
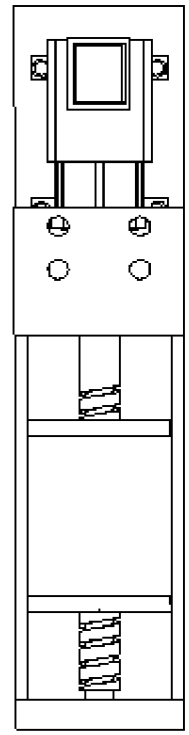
Fig. 10  Fig. 11
D-D
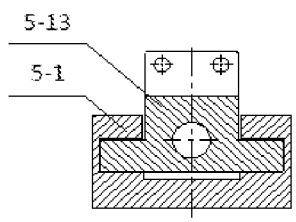
Fig. 12

MILLING MACHINE PROCESSING SYSTEM WITH INTELLIGENTLY FOLLOW-UP CUTTING FLUID NOZZLE AND WORKING METHOD THEREOF

FIELD OF THE INVENTION

The present invention relates to the technical field of machining equipment, in particular to a milling machine processing system with an intelligently follow-up cutting fluid nozzle and a working method thereof.

BACKGROUND OF THE INVENTION

Various milling cutters are often used to cut metal workpieces on CNC milling machines. Workpiece materials are deformed elastically/plastically under the cutting action of cutters during cutting, thereby generating a large amount of heat in a cutting region; and the temperature in a processing region can reach 600° C.-1200° C. instantaneously. Most of energy consumed during cutting is converted into heat accumulated on surfaces of the cutters and workpieces, which seriously affects the processing quality and the service life of the cutters, thereby reducing productivity and increasing production cost.

Cutting fluid is generally used to take away the heat from the cutting region during the machining, thereby effectively reducing the cutting temperature. The reduction of the cutting temperature can reduce thermal deformation of the workpieces and the cutters and maintain hardness of the cutters, thereby improving machining precision and cutter durability. The cutting fluid forms a local lubricating film in the processing region, which can reduce the friction between a rake face/chip and a flank face/machined surface, thereby reducing the cutting force and the cutting heat and achieving the purposes of improving the surface quality of the workpieces and prolonging the service life of the cutters. Meanwhile, the cutting fluid has excellent cleaning and chip-removal functions, and can effectively remove pollutants and chips on the surfaces of the workpieces, thereby ensuring the sharpness of the cutters and avoiding affecting the cutting effect. Moreover, the cutting fluid also has certain anti-rust capability, and can effectively prevent the workpieces from corroding due to contact with corrosive media such as oil sludge generated by decomposition or oxidative deterioration of environmental media and cutting fluid components. Due to these functions, the cutting fluid is widely applied in various fields comprising machine tool processing. However, the use of the cutting fluid also brings many problems. The temperature of the cutting region changes with the change of milling parameters in an actual milling process. However, a traditional cutting fluid supply method can not adjust the supply amount of the cutting fluid according to the temperature difference of different processing regions, has a poor overall cooling effect, and also has the defects of low use efficiency of the cutting fluid, waste of resources, environmental pollution and the like.

After searching, Yao Jun from Sihui Gelusen Lubrication Technology Co., Ltd. disclosed a cutting fluid nozzle assembly (Patent Number: CN201720445942.X). A lifting box is fixed on a mounting frame, and a first bevel gear, a second bevel gear and a bearing are arranged inside the lifting box. The first bevel gear is meshed with the second bevel gear, the first bevel gear is connected with a handle, and the handle extends to the outside of the lifting box. The second bevel gear is provided with an extension part, an outer ring of the bearing is connected with an inner wall of the lifting box, and an inner ring of the bearing is connected with the extension part. Meanwhile, the second bevel gear is provided with a threaded hole, and a liquid outlet pipe penetrates through the threaded hole and is in threaded connection with the second bevel gear. A liquid outlet nozzle is arranged at one end of the liquid outlet pipe, and the other end of the liquid outlet pipe is connected with a hose for introducing a cutting fluid, so that the nozzle can be displaced up and down and rotated. The cutting fluid nozzle assembly solves the problem of poor lubrication and heat dissipation effects caused by offset of the cutting fluid and cutting positions of the cutter after long-term use of an existing cutting fluid nozzle.

After searching, Tang Zhi et al. from Donghua University invented an external cooling device for cutting fluid of a machine tool (Patent Number: CN201610949798.3), comprising a housing and a cam coaxially arranged in the housing. A main shaft of a motor is coaxially connected with a pinion, the pinion is meshed with a gear wheel, the gear wheel is fixedly connected to the cam, and the cam is in contact with a crank of a nozzle. The motor rotates to drive the pinion to rotate; the gear wheel and the pinion are subjected to the meshing movement, thereby driving the cam to rotate about a center of the housing; the cam is rotated to drive the crank of the nozzle to move linearly, thereby driving the nozzle to rotate; and the nozzle sprays cooling fluid to cool cutters of a machine tool. The device can automatically change a spray angle of the nozzle in real time according to the calling of the machine tool to different cutters in a working state of the machine tool, thereby achieving an efficient, accurate and safe spray effect on the cutters of the machine tool.

After searching, Meng Changmin et al. from Guangdong Keruisi CNC Technology Co., Ltd. disclosed a machine tool and a cutting and cooling system thereof (Patent Number: CN201621349629.8), comprising a cooling fluid storage tank for storing cooling fluid, a pump for pumping the cooling fluid, a fluid delivery pipe for delivering the cooling fluid, a spray head assembly for spraying the cooling fluid and a fixing assembly for fixing the spray head assembly on a workbench of the machine tool. The pump is arranged on the cooling fluid storage tank and connected with the spray head assembly through the fluid delivery pipe. The spray head assembly comprises a pipe joint, a joint fixing plate and a fluid spraying head. The pipe joint is fixed on the joint fixing plate, the fluid delivery pipe is connected with the fluid spraying head through the pipe joint, and a nozzle is arranged on the fluid spraying head. When a cutting mechanism stops processing, the cutting and cooling system can continuously cool workpieces and quickly reduce the temperature of the workpieces to a safe temperature, thereby protecting the workpieces and processing cutters.

After searching, Luo Zhiqin et al. from Zhaoqing High-tech Zone Guozhuan Technology Co., Ltd. invented a stainless steel workpiece cutting device (Patent Number: CN201711064381.X). One end of a main shaft is rotatably connected with a rack, the other end of the main shaft is connected with cutters, and a side of the nozzle is fixedly connected with the rack. A gas-liquid mixture is delivered to cutter edges by the nozzle to achieve an excellent lubrication effect. The air flow blows away accumulated chips and rapidly reduces the temperature of the cutter edges.

After searching, Xiao Ming et al. from Wuhan University of Science and Technology invented a self-starting cooling and lubrication system with less cutting fluid (Patent Number: 201410119725.2), comprising an ultrasonic atomization unit, a nozzle atomization unit, a cutting heat detection unit and a circuit control module. The atomization components are controlled integrally based on the temperature of rake faces of the cutters detected by the cutting heat detection unit in real time, thereby realizing flexible combined application of various cooling and lubrication media. The self-starting cooling and lubrication system with less cutting fluid can greatly reduce consumption of the cutting fluid while ensuring an excellent overall cooling and lubrication effect, and has the characteristics of good cooling effect, convenient control and wide application range.

After searching, some existing technologies can realize flow adjustment of the cutting fluid, but fail to realize real-time adjustment of supply amount of the cutting fluid with the change of a milling position, and still have the problem of waste of cutting fluid resources caused by insufficient local fluid supply and excessive local fluid supply. Therefore, a novel system with an intelligently follow-up controllable cutting fluid nozzle needs to be designed to achieve that the nozzle can move with milling cutters, maintain an optimal spray angle and reasonably adjust the consumption of the cutting fluid in different processing regions according to actual processing needs, thereby further improving the use efficiency of the cutting fluid while ensuring the cooling and lubrication effect.

SUMMARY OF THE INVENTION

The purpose of the present invention is to overcome the defects of the prior art and provide a milling machine processing system with an intelligently follow-up cutting fluid nozzle, which can effectively improve the utilization of cutting fluid, reduce the temperature of the whole cutting region, improve the lubrication and the cooling effect and provide a new technical direction for intelligent supply of the cutting fluid in the machining field.

In order to achieve the above purpose, the following technical solutions are adopted in the present invention.

A milling machine processing system with an intelligently follow-up cutting fluid nozzle comprises a workpiece stage, a milling machine box is arranged above the workpiece stage, a milling cutter mechanism is mounted on the milling machine box for processing workpieces on the workpiece stage, a rotating mechanism is mounted on an end surface of the milling machine box located at a side of a milling cutter, the rotating mechanism is connected with a two-axis linkage mechanism and drives the two-axis linkage mechanism to rotate about a center line on which the milling cutter is located, the two-axis linkage system is connected with a nozzle through an angle adjusting mechanism for adjusting a position and an angle of the nozzle, and the milling machine processing system is further provided with an infrared temperature detection module for collecting the temperature of a processing region.

Further, the rotating mechanism comprises a large gear ring fixed on a lower end surface of the milling machine box and coaxial with the milling cutter, the large gear ring is meshed with a pinion by internal meshing, the pinion is connected with a driving mechanism, the driving mechanism is fixedly connected with a rotating ring, and the rotating ring is rotatably connected with the milling cutter mechanism. Further, the two-axis linkage mechanism comprises a Y-direction moving mechanism and an X-direction moving mechanism connected with the Y-direction moving mechanism, and the Y-direction moving mechanism is connected with the rotating mechanism.

Further, the Y-direction moving mechanism is a ball leadscrew nut transmission mechanism, a screw nut of the Y-direction moving mechanism is assembled with a first slide block, and the first slide block is fixedly connected with the X-direction moving mechanism to drive the X-direction moving mechanism to move.

Further, the X-direction moving mechanism is a ball leadscrew nut transmission mechanism, a screw nut of the X-direction moving mechanism is assembled with a second slide block, the angle adjusting mechanism is mounted inside the second slide block, and the angle adjusting mechanism is fixedly connected with the nozzle. Further, the angle adjusting mechanism comprises a wormgear, a worm and a wormgear shaft, the worm extends to the outside of the second slide block and is rotatably connected with the second slide block, the worm is meshed with the wormgear, the wormgear is fixedly connected with the wormgear shaft, the wormgear shaft is rotatably connected with the second slide block and extends to the outside of the second slide block, and one end of the wormgear shaft extending to the outside of the second slide block is fixedly connected with the nozzle.

Further, one end of a worm shaft extending to the outside of the second slide block is provided with a hexagonal square head, which is convenient to adjust the angle of the nozzle by using a wrench.

Further, scale lines of 0°-360° are arranged on the end surface of the second slide block on a side in which the nozzle is located.

Further, the nozzle is of a straight cylinder shape, and straight scale lines are arranged on an outer circumferential surface of the nozzle.

The present invention also discloses a working method of the milling machine processing system with an intelligently follow-up cutting fluid nozzle, comprising the following steps:

step 1: fixing the workpiece on the workpiece stage; and
step 2: adjusting the position of the milling cutter mechanism, so that the milling cutter of the milling cutter mechanism is in contact with the surface to be processed of the workpiece, starting the milling cutter mechanism to work, processing the workpiece, collecting temperature distribution information of the processing region in real time during processing and feeding back the temperature distribution information to a control system of the milling machine by the infrared temperature detection module, controlling the rotating mechanism and the two-axis linkage mechanism to work by the control system of the milling machine, adjusting the position of the nozzle and adjusting the supply amount of the cutting fluid.

The nozzle adjusts the position and the supply amount of the cutting fluid in real time according to temperature collection situations, and reasonably adjusts the consumption of the cutting fluid in different regions according to needs, thereby avoiding the problem of waste of cutting fluid resources caused by insufficient local fluid supply and excessive local fluid supply.

Beneficial Effects of the Present Invention

1. The milling machine processing system according to the present invention is provided with the rotating mechanism and the two-axis linkage mechanism, and realizes effective controllability of the spraying angle, the distance and the flow rate of the nozzle by utilizing flexible cooperation of the rotating mechanism, the Y-direction moving mechanism and the X-direction moving mechanism, thereby realizing intelligent fluid supply of the processing region and avoiding problems of overheating and waste caused by insufficient local fluid supply and excessive local fluid supply.

2. The milling machine processing system according to the present invention accurately collects the temperature of the milling processing region by the infrared temperature detection module, transmits signals to the control system of the cutting fluid supply milling machine in real time to realize intelligent fluid supply, has the characteristics of sensitive response, convenient operation and control, high control precision and the like, and can ensure intelligent supply of the cutting fluid.

BRIEF DESCRIPTION OF THE DRAWINGS

The accompanying drawings constituting a part of the present application are used for providing a further understanding on the present application, and the schematic embodiments of the present application and the descriptions thereof are used for interpreting the present application, rather than constituting improper limitations to the present application.

FIG. 10 is a schematic diagram of an internal structure of a Y-direction moving mechanism according to the present invention;

FIG. 11 is a schematic front view of the Y-direction moving mechanism according to the present invention;

FIG. 12 is a schematic diagram of a direction D in FIG. 11 according to the present invention;

In the figures: 1. Workpiece stage, 2. Milling machine box, 3. Milling cutter mechanism, 3-1. Milling cutter, 3-2. Shank, 3-3. Protective sleeve, 4. Rotating mechanism, 4-1. Large gear ring, 4-2. Pinion, 4-3. First motor, 4-4. Shaft end baffle, 4-5. Rotating ring, 4-6. Thrust self-aligning roller bearing, 4-7. Bearing retaining ring, 4-8. Bearing clamping ring, 4-8-1. Semicircular clamping ring, 5. Y-direction moving mechanism, 5-1. Y-direction guide rail, 5-1-1. Extension plate, 5-2. First leadscrew, 5-3. First angular contact ball bearing, 5-4. Upper cover plate, 5-5. Lower cover plate, 5-6. External circlip, 5-7. First oil retaining ring, 5-8. First sealing ring, 5-9. Adjusting gasket, 5-10. Plum coupling, 5-11. Second motor, 5-12. First leadscrew nut, 5-13. First slide block, 6. X-direction moving mechanism, 6-1. X-direction guide rail, 6-2. Second slide block, 6-3. Wormgear, 6-4. Worm, 6-5. Wormgear shaft, 6-6. Second angular contact ball bearing, 6-7. Second sealing ring, 6-8. Second oil retaining ring, 6-9. Hexagonal square head, 6-10. Third angular contact ball bearing, 6-11. Third motor, 6-12. Second leadscrew nut, 7. Nozzle, 8. Nozzle holder, 8-1. Clamping plate.

DETAILED DESCRIPTION OF THE EMBODIMENTS

It should be noted that the following detailed illustrations are exemplary and are intended to provide further explanation for the present application. All technical and scientific terms used herein have the same meanings as commonly understood by those ordinary skilled in the art to which the present application belongs, unless specified otherwise.

It should be noted that terms used herein are intended to describe specific embodiments only rather than to limit the exemplary embodiments according to the present application. As used herein, the singular form is also intended to comprise the plural form unless otherwise indicated in the context. In addition, it should be understood that when the terms "include" and/or "comprise" are used in the description, they are intended to indicate the presence of features, steps, operations, devices, components and/or combinations thereof.

As introduced in the background, the existing milling machine processing systems fail to realize real-time adjustment of supply amount of the cutting fluid with the change of a milling position, and still have the problems of waste of cutting fluid resources and the like caused by insufficient local fluid supply and excessive local fluid supply. In view of the above problems, the present application proposes a milling machine processing system with an intelligently follow-up cutting fluid nozzle.

Figure 1:
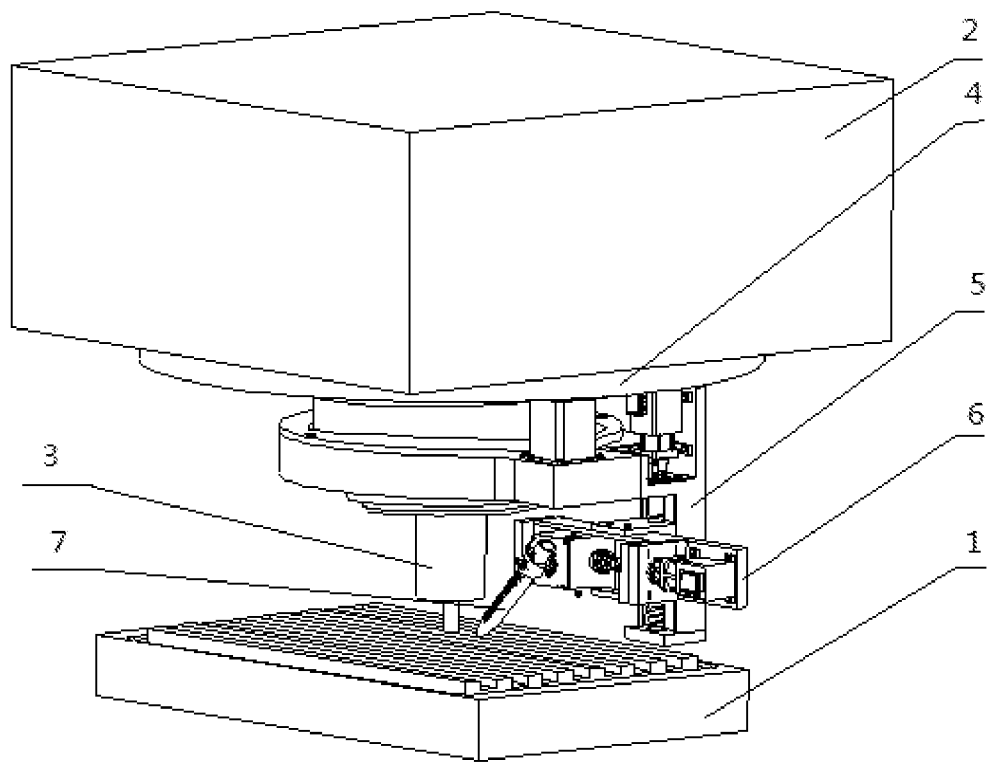
FIG. 1 is a schematic diagram of an overall structure according to the present invention.
Figure 2:
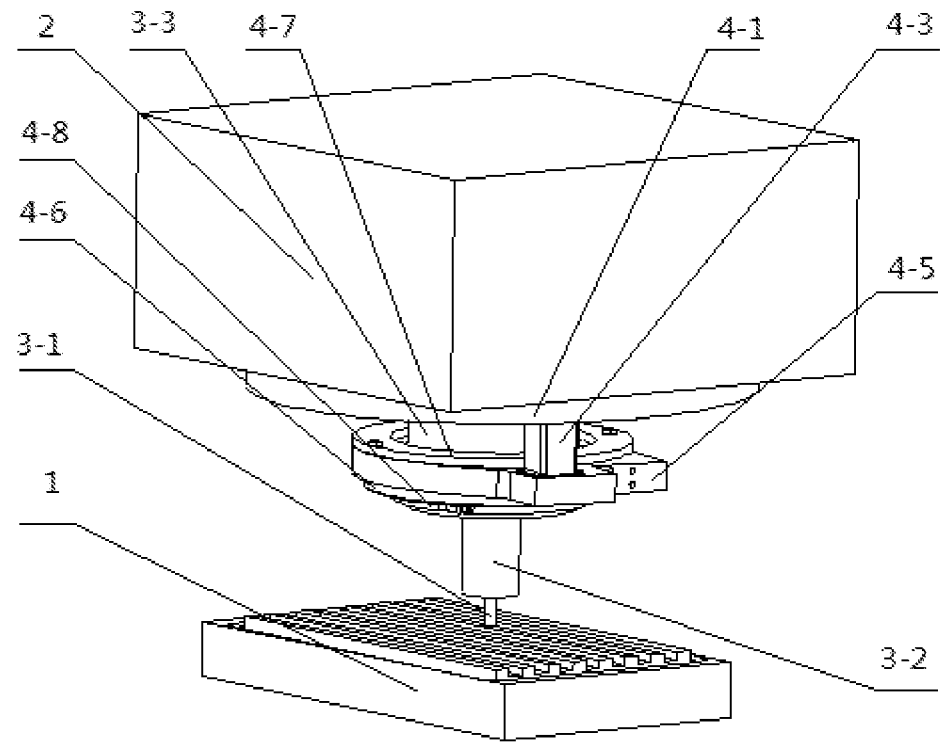
FIG. 2 is a schematic diagram of assembly of a rotating mechanism and a milling cutter mechanism according to the present invention.
Figure 3:
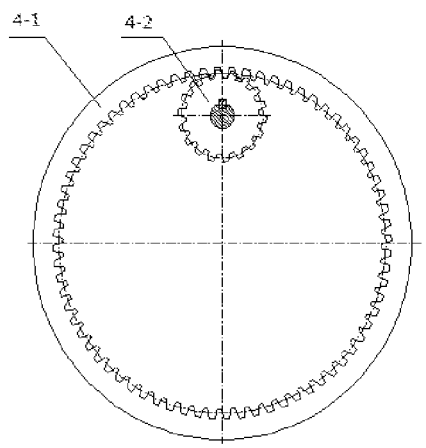
FIG. 3 is a schematic diagram of matching of a large gear ring and a pinion according to the present invention.
Figure 4:
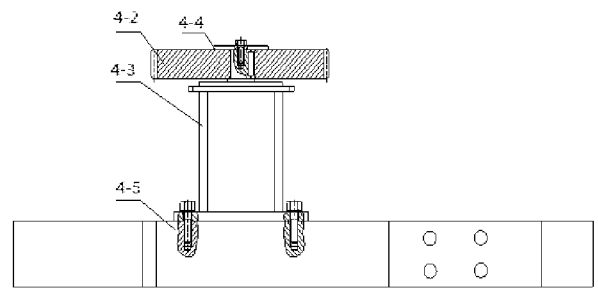
FIG. 4 is a schematic diagram of matching of a first motor, a pinion and a rotating ring according to the present invention.
Figure 5:
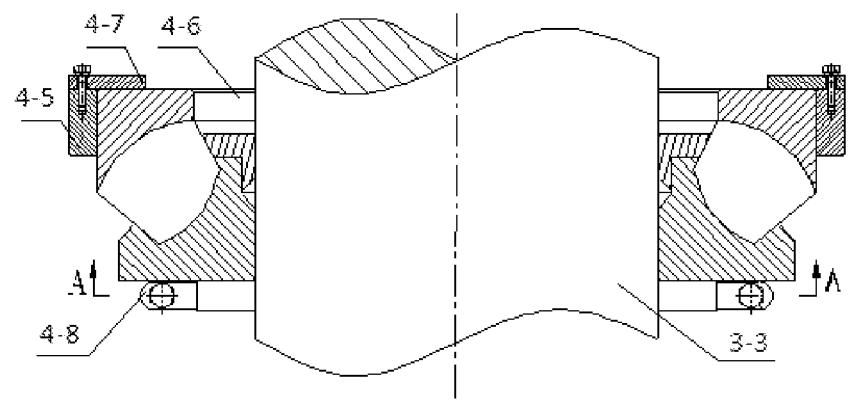
FIG. 5 is a schematic diagram of matching of the rotating ring and a protective sleeve according to the present invention.
Figure 6:
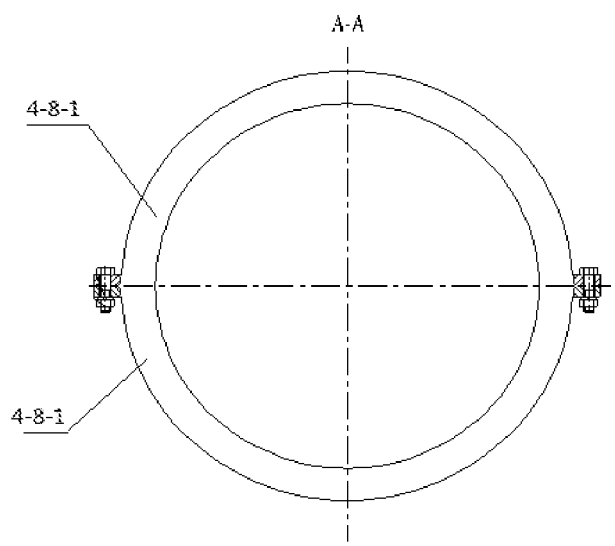
FIG. 6 is a schematic diagram of a direction A in FIG. 5 according to the present invention.
Figure 7:
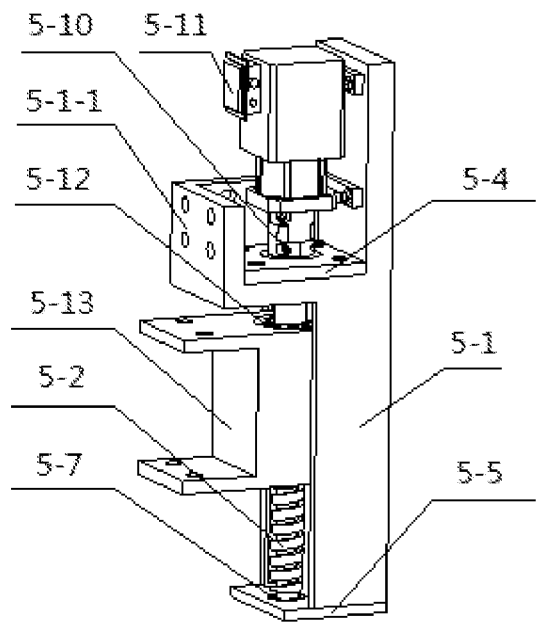
FIG. 7 is an axonometric schematic diagram of a Y-direction moving mechanism according to the present invention.
Figure 8:
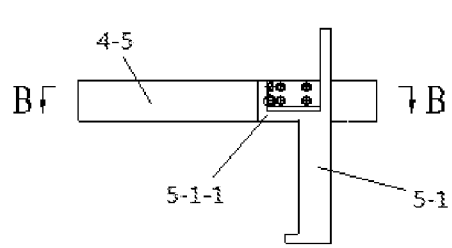
FIG. 8 is a schematic diagram of matching of a Y-direction guide rail and a rotating ring according to the present invention.
Figure 9:
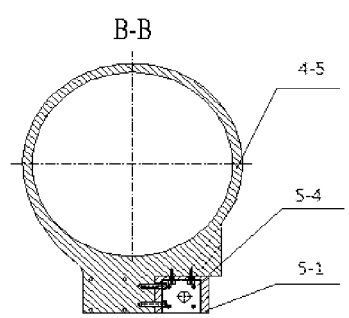
FIG. 9 is a schematic diagram of a direction B in FIG. 8 according to the present invention.
Figure 13:
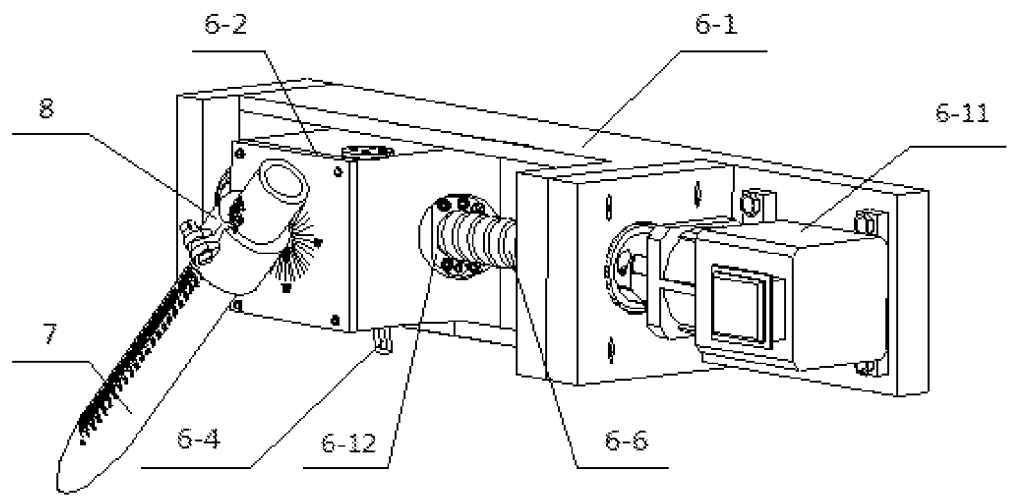
FIG. 13 is an axonometric schematic diagram of an X-direction moving mechanism according to the present invention.
Figure 14:
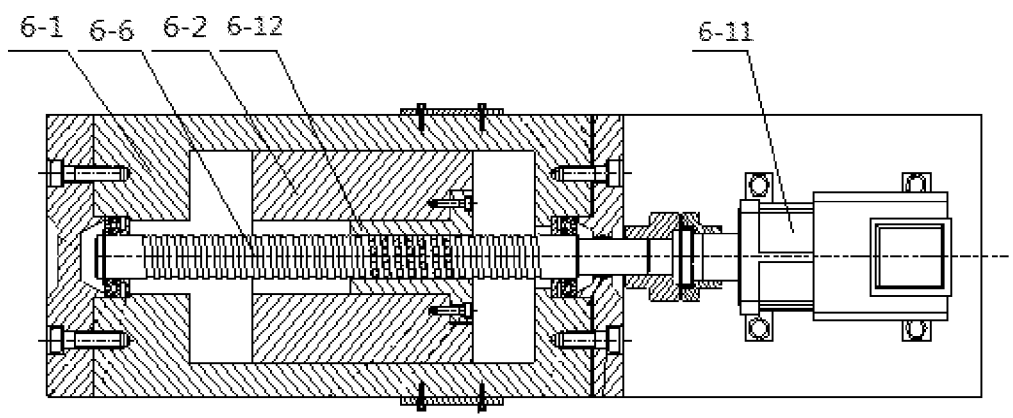
FIG. 14 is a schematic diagram of an internal structure of an X-direction moving mechanism according to the present invention.
Figure 15:
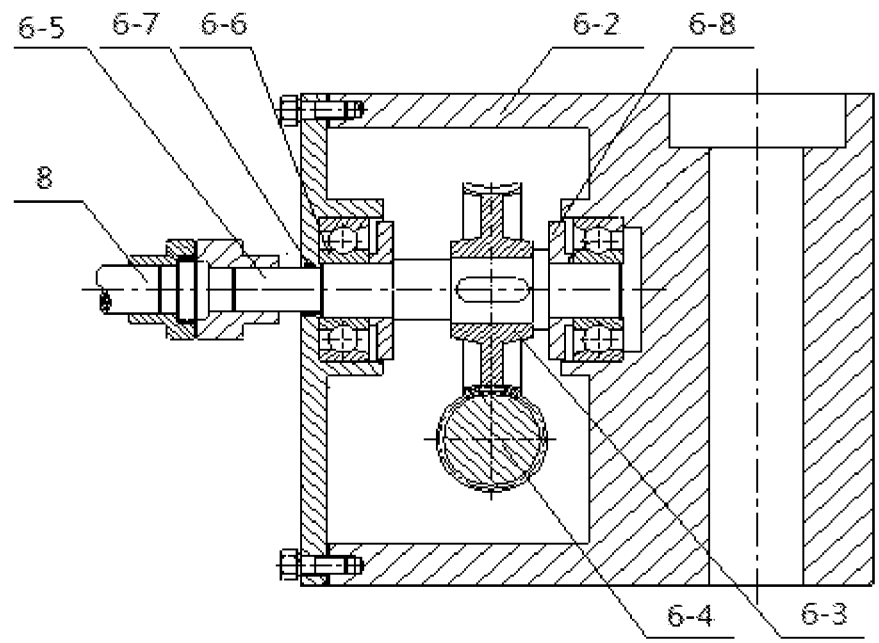
FIG. 15 is a schematic diagram 1 of an angle adjusting mechanism according to the present invention.
Figure 16:
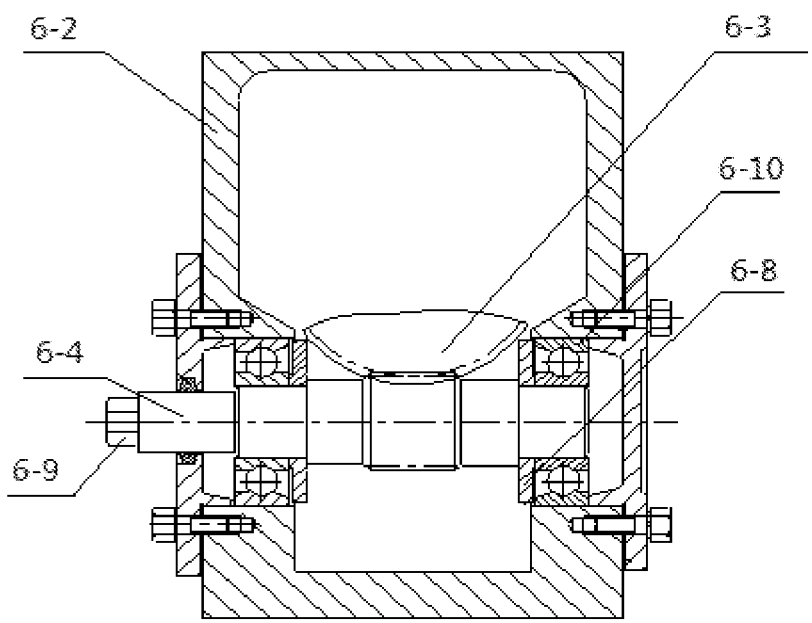
FIG. 16 is a schematic diagram 2 of the angle adjusting mechanism according to the present invention.
Figure 17:
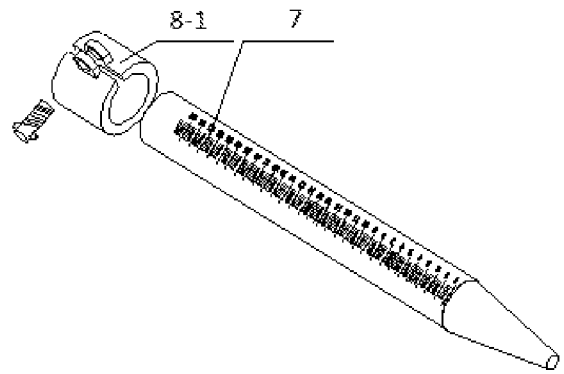
FIG. 17 is an exploded schematic structural diagram of a nozzle holder and a nozzle according to the present invention.
Figure 18:
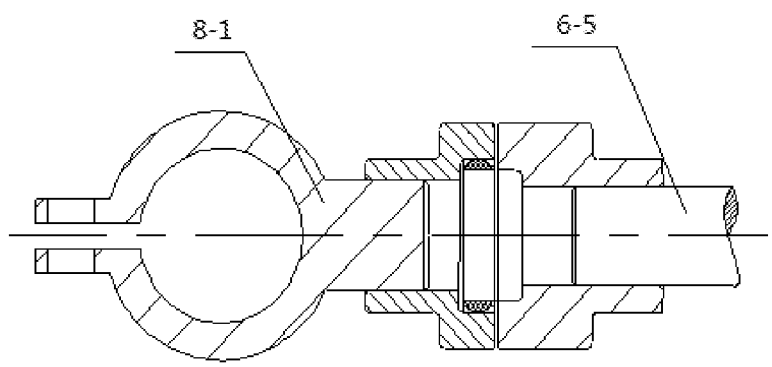
FIG. 18 is a schematic diagram of assembly of a nozzle holder and a worm according to the present invention.
Figure 19:
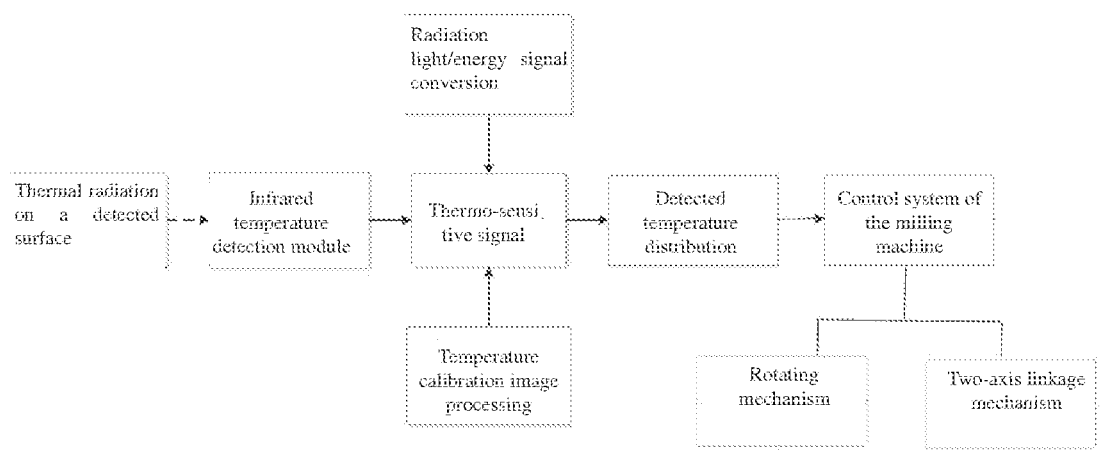
FIG. 19 is a schematic diagram 1 of a working principle according to the present invention.
Figure 20:
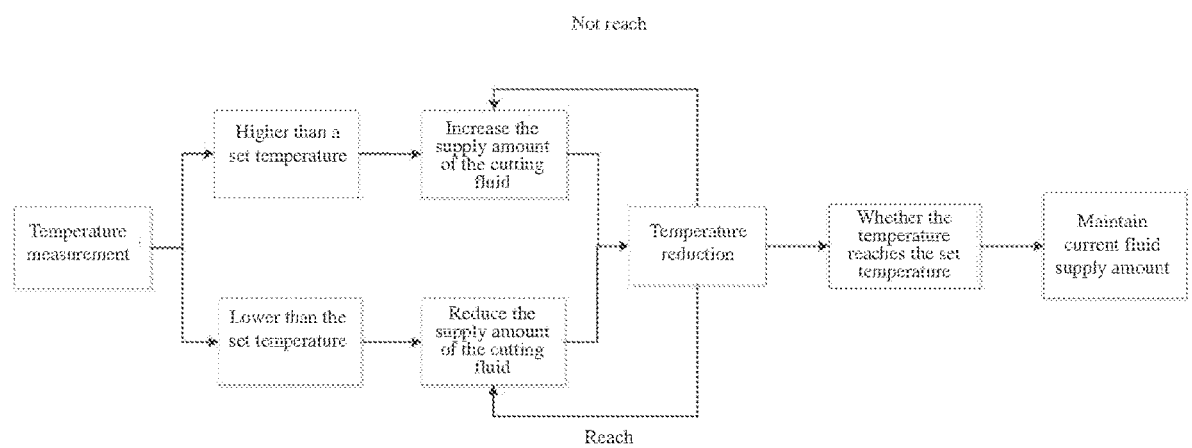
FIG. 20 is a schematic diagram 2 of a working principle according to the present invention.

In a typical embodiment of the present application, as shown in FIGS. 1-20, a milling machine processing system with an intelligently follow-up cutting fluid nozzle comprises a workpiece stage 1, a milling machine box 2 is arranged above the workpiece stage, a milling cutter mechanism 3 is mounted on the milling machine box for processing workpieces on the workpiece stage, a rotating mechanism 4 is mounted on an end surface of the milling machine box located at a side of a milling cutter, the rotating mechanism is connected with a two-axis linkage mechanism and drives the two-axis linkage mechanism to rotate about a center line on which the milling cutter is located, the two-axis linkage system is connected with a nozzle 7 through an angle adjusting mechanism for adjusting a position and an angle of the nozzle, and the milling machine processing system is further provided with an infrared temperature detection module for collecting the temperature of a processing region.

The workpiece stage, the milling machine box and the milling cutter mechanism adopt structures of an existing milling machine, the milling cutter mechanism is provided with the milling cutter 3-1 for processing the workpieces, the milling cutter is fixed on a shank 3-2, the shank is connected with a power device in the milling machine box by a protective sleeve 3-3, and the specific structure is not described in detail herein. The rotating mechanism 4 comprises an annular large gear ring 4-1, a magnetic material is attached to an upper end surface of the large gear ring and is fixedly attached with a lower surface of the milling machine box, teeth are arranged on an inner side of the large gear ring and are meshed with a pinion 4-2 in an internal meshing manner, the pinion is connected with a driving mechanism. Preferably, the driving mechanism is a first motor 4-3, an output shaft of the first motor is fixedly connected with the pinion by a shaft end baffle 4-4 and fixing screws, and the pinion has a certain distance from the lower surface of the milling machine box to avoid direct contact between the pinion and the milling machine box and avoid generating friction against the rotation of the pinion. The first motor is fixedly connected with an upper end surface of a rotating ring 4-5 by four bolts and washers, the rotating ring is rotatably connected with the protective sleeve by a thrust self-aligning roller bearing 4-6, an inner ring of the thrust self-aligning roller bearing is directly sleeved on the protective sleeve, an outer ring is fixedly connected with the rotating ring through interference fit, the upper end surface of the thrust self-aligning roller bearing is provided with a bearing retaining ring 4-7, the bearing retaining ring is fixedly connected with the upper end surface of the rotating ring by fixing bolts and washers so that the rotating ring is axially positioned, a bearing clamping ring 4-8 is arranged at the lower end surface of the thrust self-aligning roller bearing, the bearing clamping ring comprises two semicircular clamping rings, and the two semicircular clamping rings 4-8-1 are fixed by the bolts and the washers and are clamped on the protective sleeve, to prevent the thrust self-aligning roller bearing from falling off. After the first motor is powered on, the pinion rotates circumferentially along the large gear ring, and the rotating ring also starts to rotate, thereby driving the two-axis linkage mechanism, the angle adjusting mechanism and the nozzle to rotate circumferentially about a central axis of the milling cutter.

The two-axis linkage mechanism comprises a Y-direction moving mechanism 5 and an X-direction moving mechanism 6.

The Y-direction moving mechanism 5 is a first ball leadscrew nut transmission mechanism and comprises a Y-direction guide rail 5-1, the Y-direction guide rail is provided with an extension plate 5-1-1 and is fixed on an outer side surface of the rotating ring by the extension plate and eight fixing screws and spring washers, a first leadscrew 5-2 penetrates through the extension plate, both ends of the first leadscrew are respectively connected with an upper cover plate 5-4 and a lower cover plate 5-5 by a first angular contact ball bearing 5-3, the first angular contact ball bearing can support the first leadscrew and ensure rotation precision thereof, and the first angular contact ball bearing is axially positioned by utilizing the lower cover plate and a shaft shoulder, and is provided with external circlips 5-6 to prevent axial movement. The angular contact is usually lubricated with grease. In order to prevent lubricating oil in an oil pool from being splashed into the first angular contact ball bearing to dilute the lubricating grease and reduce the lubrication effect, a first oil retaining ring 5-7 is arranged on the inner side of the first angular contact ball bearing, the first oil retaining ring rotates together with the first leadscrew and the inner ring of the first angular contact ball bearing, the lower cover plate is fixed on the Y-direction guide rail by the fixing screws and the washers, a mounting distance is adjusted by utilizing an adjusting gasket, the lower cover plate also plays a dust-proof and sealing role, the upper cover plate is fixed on the extension plate by the fixing screws and the washers, a T-shaped groove is formed in the upper cover plate, a first sealing ring 5-8 is arranged inside the T-shaped groove to prevent chips, water or other sundries from entering the first angular contact ball bearing and prevent a lubricant from losing, and an adjusting gasket 5-9 is arranged between the upper cover plate and the extension plate for positioning the upper cover plate. The first leadscrew is connected with an output shaft of a second motor 5-11 by a plum coupling 5-10, the second motor is fixed on the extension plate, the first leadscrew is assembled with a first leadscrew nut 5-12 to form a rotary pair, the leadscrew nut is fixed with a first slide block 5-13 by the screws and the washers, and the first slide block is embedded into a T-shaped sliding chute of the Y-direction guide rail.

The X-direction moving mechanism 6 is a second ball leadscrew nut transmission mechanism, which has a structure similar to that of the first ball leadscrew nut transmission mechanism and is driven by a third motor 6-11. The difference is that, the X-direction moving mechanism 6 comprises an X-direction guide rail 6-1, which is fixedly connected with the first slide block, a second sleadscrew 6-6 of the second ball leadscrew nut transmission mechanism is assembled with a second leadscrew nut 6-12, a second slide block 6-2 is mounted on the second leadscrew nut, the second slide block is formed by combining a plurality of cover plates, and an inner space of the second slide block is divided into two parts, wherein one part is used for accommodating the second leadscrew nut, a second leadscrew and an assembling and connecting piece, and the other part is used for accommodating the angle adjusting mechanism.

The angle adjusting mechanism comprises a wormgear 6-3, a worm 6-4 and a wormgear shaft 6-5, the wormgear shaft extends to the outside of the second slide block and is rotatably connected with a cover plate of the second slide block by a second angular contact ball bearing 6-6, the second angular contact ball bearing is axially positioned by utilizing the shaft shoulder and the cover plate, a second sealing ring 6-7 is arranged at a joint of the wormgear shaft and the cover plate of the second slide block to prevent external dust from entering the second slide block and also prevent spattered chips and cooling fluid from entering during milling and affecting the precision of the angle adjusting mechanism, the wormgear shaft is fixedly connected with the wormgear 6-3 in a key connection manner, the wormgear is meshed with the worm 6-4, the worm extends to the outside of the second slide block, the worm is rotatably connected with the cover plate of the second slide block by a third angular contact ball bearing 6-10 and is provided with a second sealing ring for sealing, and the third angular contact ball bearing is axially positioned by utilizing the shaft shoulder and the cover plate of the second slide block. In order to prevent the lubricating oil in the oil pool from being splashed into the third or second angular contact ball bearing, diluting the lubricating grease and reducing the lubrication effect, second oil retaining rings 6-8 are arranged on the inner sides of the third angular contact ball bearing and the second angular contact ball bearing.

One end of the wormgear shaft extending out of the second slide block is fixedly connected with the nozzle 7 by a nozzle holder 8, and one end of the worm extending out of the second slide block is provided with a hexagonal square head 6-9, so that the angle of the nozzle can be conveniently adjusted by using a wrench.

Scale lines of 0°-360° are arranged on the cover plate of the second slide block on a side in which the nozzle is located, so that an operator can conveniently adjust the angle of the nozzle.

The nozzle holder 8 comprises two clamping plates 8-1 with semicircular cross sections, the two clamping plates are fixed by the bolts and are used to clamp the nozzle, the nozzle is processed into a straight cylinder shape, and straight scale lines are arranged on an outer circumferential surface of the nozzle, so that the position for clamping the nozzle can be conveniently adjusted.

The infrared temperature detection module acquires temperature information of the processing region by adopting an external infrared thermal imager, the infrared thermal imager is clamped by a universal magnetic stand, and the angle and the shooting region of the infrared thermal imager can be continuously adjusted to acquire the temperatures of different processing positions. The universal magnetic stand is sucked to the milling machine by an own magnetic base, and can be selectively sucked to different non-processing positions of the milling machine according to actual needs. This mounting manner is adopted to realize flexible application and convenient adjustment while realizing functions.

The present invention also discloses a working method of the milling machine processing system with an intelligently follow-up cutting fluid nozzle, comprising the following steps:

step 1: fixing a workpiece on the workpiece stage; and step 2: adjusting the position of the milling cutter mechanism, so that the milling cutter of the milling cutter mechanism is in contact with the surface to be processed of the workpiece, starting the milling cutter mechanism to work, processing the workpiece, collecting temperature distribution information of the processing region in real time during processing and feeding back the temperature distribution information to a control system of the milling machine by the infrared temperature detection module, controlling the rotating mechanism and the two-axis linkage mechanism to work by the control system of the milling machine, adjusting the position of the nozzle, adjusting the supply amount of the cutting fluid, and adjusting the angle of the nozzle by rotating the hexagonal head with the wrench.

Specifically, the infrared temperature detection module obtains a thermo-sensitive signal through radiation light/energy signal conversion of thermal radiation on the surface of the processing region, obtains temperature distribution of the processing region through temperature calibration image processing, and transmits the temperature distribution to the control system of the milling machine, and the control system of the milling machine drives the rotating mechanism and the two-axis linkage mechanism to work according to the temperature condition, adjusts the position of the nozzle, adjusts the nozzle to be close to the region at a high temperature, adjusts the nozzle to be far away from the region at a low temperature, adjusts the supply amount of the cutting fluid according to the temperature condition, increases the supply amount of the cutting fluid when the temperature is higher than a set temperature until the temperature is reduced to the set temperature, then maintains the supply amount of the cutting fluid, reduces the supply amount of the cutting fluid when the temperature is lower than the set temperature, and maintains the supply amount of the cutting fluid when the temperature reaches the set temperature.

The nozzle adjusts the position and the supply amount of the cutting fluid in real time according to temperature collection situations, and reasonably adjusts the consumption of the cutting fluid in different regions according to needs, thereby avoiding the problem of waste of cutting fluid resources caused by insufficient local fluid supply and excessive local fluid supply.

The specific embodiments of the present invention are described above with reference to the accompanying drawings, but are not intended to limit a protection scope of the present invention. Those skilled in the art should understand that various modifications or variations that can be made by those skilled in the art without contributing creative labor are still within the protection scope of the present invention on the basis of the technical solution of the present invention.

The invention claimed is:

1. A working method of a milling machine processing system with an intelligently follow-up cutting fluid nozzle, wherein the milling machine processing system comprises a workpiece stage, wherein a milling machine box body is arranged above the workpiece stage in a Y-direction; a milling cutter mechanism is mounted on the milling machine box body for processing a workpiece, wherein a rotating mechanism is mounted on an end surface of the milling machine box body located at one side of a milling cutter; the rotating mechanism is connected with a two-axis linkage mechanism and drives the two-axis linkage mechanism to move along a circumferential path that circumferentially extends in a full circle so as to have the two-axis linkage mechanism rotate about a center line on which the milling cutter is located; the two-axis linkage mechanism is connected with the nozzle through an angle adjusting mechanism and is used for adjusting a position and an angle of the nozzle, wherein the two-axis linkage mechanism comprises a Y-direction moving mechanism operable to adjust the position of the nozzle in the Y-direction and an X-direction moving mechanism connected with the Y-direction moving mechanism and operable to adjust the position of the nozzle in an X-direction that is transverse to the Y-direction; and the Y-direction moving mechanism is connected with the rotating mechanism; and wherein the Y-direction moving mechanism comprise a ball screw nut transmission mechanism that comprises a ball screw and a nut is in mating engagement with the ball screw, the nut being provided with a first slide block; and the first slide block is fixedly connected with the X-direction moving mechanism to drive the X-direction moving mechanism to move, the working method comprising the following steps:

step 1: fixing the workpiece on the workpiece stage; and step 2: adjusting a position of the milling cutter mechanism, so that the milling cutter of the milling cutter mechanism is in contact with the workpiece, starting the milling cutter mechanism to work in a processing region for processing the workpiece, collecting temperature distribution information of the processing region in real time during the processing of the workpiece, and feeding back the temperature distribution information to the milling machine processing system, so that the milling machine processing system is operable to adjust a position of the nozzle by actuating the rotating mechanism and the two-axis linkage mechanism to have the two-axis linkage mechanism rotate about the center line on which the milling cutter is located and to have the nozzle selectively moved by the two axis-linkage mechanism in the X-direction and the Y-direction and is also operable to adjust an amount of cutting fluid supplied through the nozzle.

2. A working method of a milling machine processing system with an intelligently follow-up cutting fluid nozzle, wherein the milling machine processing system comprises a workpiece stage, wherein a milling machine box body is arranged above the workpiece stage in a Y-direction; a milling cutter mechanism is mounted on the milling machine box body for processing a workpiece, wherein a rotating mechanism is mounted on an end surface of the milling machine box body located at one side of a milling cutter; the rotating mechanism is connected with a two-axis linkage mechanism and drives the two-axis linkage mechanism to move along a circumferential path that circumferentially extends in a full circle so as to have the two-axis linkage mechanism rotate about a center line on which the milling cutter is located; the two-axis linkage mechanism is connected with the nozzle through an angle adjusting mechanism and is used for adjusting a position and an angle of the nozzle, wherein the two-axis linkage mechanism comprises a Y-direction moving mechanism operable to adjust the position of the nozzle in the Y-direction and an X-direction moving mechanism connected with the Y-direction moving mechanism and operable to adjust the position of the nozzle in an X-direction that is transverse to the Y-direction; and the Y-direction moving mechanism is connected with the rotating mechanism; and wherein the Y-direction moving mechanism comprise a ball screw nut transmission mechanism that comprises a ball screw and a nut is in mating engagement with the ball screw, the nut being provided with a first slide block; and the first slide block is fixedly connected with the X-direction moving mechanism to drive the X-direction moving mechanism to move, wherein the rotating mechanism comprises a gear ring fixed on a lower end surface of the milling machine box body and coaxial with the milling cutter; the gear ring is meshed with a pinion by internal meshing; the pinion is connected with a driving mechanism; the driving mechanism is fixedly connected with a rotating ring; and the rotating ring is rotatably connected with the milling cutter mechanism, the working method comprising the following steps:
step 1: fixing the workpiece on the workpiece stage; and
step 2: adjusting a position of the milling cutter mechanism, so that the milling cutter of the milling cutter mechanism is in contact with the workpiece, starting the milling cutter mechanism to work in a processing region for processing the workpiece, collecting temperature distribution information of the processing region in real time during the processing of the workpiece, and feeding back the temperature distribution information to the milling machine processing system, so that the milling machine processing system is operable to adjust a position of the nozzle by actuating the rotating mechanism and the two-axis linkage mechanism to have the two-axis linkage mechanism rotate about the center line on which the milling cutter is located and to have the nozzle selectively moved by the two axis-linkage mechanism in the X-direction and the Y-direction and is also operable to adjust an amount of cutting fluid supplied through the nozzle.

3. A working method of a milling machine processing system with an intelligently follow-up cutting fluid nozzle, wherein the milling machine processing system comprises a workpiece stage, wherein a milling machine box body is arranged above the workpiece stage in a Y-direction; a milling cutter mechanism is mounted on the milling machine box body for processing a workpiece, wherein a rotating mechanism is mounted on an end surface of the milling machine box body located at one side of a milling cutter; the rotating mechanism is connected with a two-axis linkage mechanism and drives the two-axis linkage mechanism to move along a circumferential path that circumferentially extends in a full circle so as to have the two-axis linkage mechanism rotate about a center line on which the milling cutter is located; the two-axis linkage mechanism is connected with the nozzle through an angle adjusting mechanism and is used for adjusting a position and an angle of the nozzle, wherein the two-axis linkage mechanism comprises a Y-direction moving mechanism operable to adjust the position of the nozzle in the Y-direction and an X-direction moving mechanism connected with the Y-direction moving mechanism and operable to adjust the position of the nozzle in an X-direction that is transverse to the Y-direction; and the Y-direction moving mechanism is connected with the rotating mechanism; and wherein the Y-direction moving mechanism comprise a ball screw nut transmission mechanism that comprises a ball screw and a nut is in mating engagement with the ball screw, the nut being provided with a first slide block; and the first slide block is fixedly connected with the X-direction moving mechanism to drive the X-direction moving mechanism to move, wherein the rotating mechanism comprises a gear ring fixed on a lower end surface of the milling machine box body and coaxial with the milling cutter; the gear ring is meshed with a pinion by internal meshing; the pinion is connected with a driving mechanism; the driving mechanism is fixedly connected with a rotating ring; and the rotating ring is rotatably connected with the milling cutter mechanism, and wherein the X-direction moving mechanism comprises a ball screw nut transmission mechanism; the ball screw nut transmission mechanism of the X-direction moving mechanism comprises a ball screw with which a nut is set in mating engagement, and the nut of the ball screw nut transmission mechanism of the X-direction moving mechanism is provided with a second slide block; the angle adjusting mechanism is mounted inside the second slide block; and the angle adjusting mechanism is fixedly connected with the nozzle, the working method comprising the following steps:
step 1: fixing the workpiece on the workpiece stage; and
step 2: adjusting a position of the milling cutter mechanism, so that the milling cutter of the milling cutter mechanism is in contact with the workpiece, starting the milling cutter mechanism to work in a processing region for processing the workpiece, collecting temperature distribution information of the processing region in real time during the processing of the workpiece, and feeding back the temperature distribution information to the milling machine processing system, so that the milling machine processing system is operable to adjust a position of the nozzle by actuating the rotating mechanism and the two-axis linkage mechanism to have the two-axis linkage mechanism rotate about the center line on which the milling cutter is located and to have the nozzle selectively moved by the two axis-linkage mechanism in the X-direction and the Y-direction and is also operable to adjust an amount of cutting fluid supplied through the nozzle.

\* \* \* \* \*